US007664064B2

(12) United States Patent
Lee et al.

(10) Patent No.: US 7,664,064 B2
(45) Date of Patent: Feb. 16, 2010

(54) METHOD AND APPARATUS FOR PROVIDING POINT-TO-MULTIPOINT MULTIMEDIA SERVICE IN A MOBILE COMMUNICATIONS SYSTEM

(75) Inventors: Young Dae Lee, HaNam-shi (KR); Sung Duck Chun, Anyang (KR); Myung Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 546 days.

(21) Appl. No.: 11/318,031

(22) Filed: Dec. 23, 2005

(65) Prior Publication Data

US 2006/0182051 A1    Aug. 17, 2006

(30) Foreign Application Priority Data

Feb. 15, 2005   (KR) ...................... 10-2005-0012363

(51) Int. Cl.
   *H04H 20/71* (2008.01)
(52) U.S. Cl. ...................... 370/312; 455/3.06; 455/517; 455/452.2; 455/458; 455/426.1; 455/503; 455/466; 370/310.2; 370/329; 370/331
(58) Field of Classification Search ................. 455/522, 455/69, 450–452.2, 3.01, 41.2, 458, 517, 455/426.1, 503; 370/312, 329, 331
   See application file for complete search history.

(56) References Cited

U.S. PATENT DOCUMENTS

| 6,212,176 | B1 * | 4/2001 | Andersson et al. ........... 370/347 |
| 6,628,946 | B1 * | 9/2003 | Wiberg et al. ................ 455/434 |
| 6,717,925 | B1 * | 4/2004 | Leppisaari et al. ........... 370/312 |
| 6,975,865 | B1 * | 12/2005 | Vaisanen ..................... 455/444 |
| 6,990,359 | B2 * | 1/2006 | Wager ......................... 455/561 |
| 7,065,126 | B2 * | 6/2006 | Reznik et al. ................ 375/130 |
| 7,212,824 | B2 * | 5/2007 | Terry ........................... 455/450 |
| 7,242,919 | B2 * | 7/2007 | Kim et al. .................... 455/313 |
| 7,346,339 | B2 * | 3/2008 | Lee et al. .................. 455/414.1 |
| 7,372,823 | B2 * | 5/2008 | Balachandran et al. ....... 370/312 |
| 7,450,933 | B2 * | 11/2008 | Kwak et al. ............... 455/414.1 |
| 7,499,455 | B2 * | 3/2009 | Lee et al. ................. 370/395.5 |
| 7,526,304 | B2 * | 4/2009 | Bachl et al. ................. 455/515 |
| 7,546,132 | B2 * | 6/2009 | Lee et al. .................... 455/503 |
| 7,554,935 | B2 * | 6/2009 | Leppisaari et al. .......... 370/312 |
| 7,558,228 | B2 * | 7/2009 | Lee et al. .................... 370/312 |
| 7,583,629 | B2 * | 9/2009 | Lee et al. .................... 370/329 |

(Continued)

FOREIGN PATENT DOCUMENTS

EP        1345402         9/2003

(Continued)

*Primary Examiner*—Sharad Rampuria
(74) *Attorney, Agent, or Firm*—Lee, Hong, Degerman, Kang & Waimey

(57) ABSTRACT

The present invention relates to a method and apparatus for providing at least one user equipment (UE) with a point-to-multipoint multimedia service through two or more common physical channels in a mobile communications system. A radio network transmits a point-to-multipoint multimedia service through a plurality of physical channels using multiple codes. A user equipment (UE) receives multiple channel code information through a control channel from the radio network, configures a plurality of physical channels using the received multiple channel code information and receives the point-to-multipoint multimedia service through the configured physical channels.

17 Claims, 11 Drawing Sheets

U.S. PATENT DOCUMENTS

| | | | |
|---|---|---|---|
| 7,586,874 B2 * | 9/2009 | Rudolf et al. ................ 370/330 |
| 2002/0077087 A1 * | 6/2002 | Li ................................ 455/414 |
| 2003/0012149 A1 * | 1/2003 | Maggenti et al. ............ 370/260 |
| 2003/0027695 A1 | 2/2003 | Lee |
| 2003/0134622 A1 * | 7/2003 | Hsu et al. .................... 455/414 |
| 2003/0207696 A1 * | 11/2003 | Willenegger et al. ........ 455/522 |
| 2004/0057405 A1 * | 3/2004 | Black ......................... 370/335 |
| 2004/0087320 A1 | 5/2004 | Kim |
| 2004/0136400 A1 * | 7/2004 | Majidi-Ahy et al. ......... 370/469 |
| 2004/0142706 A1 * | 7/2004 | Kim et al. .................... 455/458 |
| 2004/0156332 A1 * | 8/2004 | Terry et al. .................. 370/328 |
| 2004/0180675 A1 * | 9/2004 | Choi et al. ................... 455/458 |
| 2004/0180681 A1 * | 9/2004 | Jeong et al. .................. 455/503 |
| 2004/0202140 A1 | 10/2004 | Kim |
| 2004/0229605 A1 * | 11/2004 | Hwang et al. ............. 455/426.1 |
| 2005/0037768 A1 * | 2/2005 | Hwang et al. ................ 455/450 |
| 2005/0053023 A1 * | 3/2005 | Rajkotia et al. .............. 370/312 |
| 2005/0090278 A1 * | 4/2005 | Jeong et al. .................. 455/525 |
| 2005/0096017 A1 | 5/2005 | Kim |
| 2005/0111395 A1 * | 5/2005 | Hwang et al. ................ 370/313 |
| 2005/0118992 A1 * | 6/2005 | Jeong et al. ............... 455/422.1 |
| 2005/0143085 A1 * | 6/2005 | Bi et al. ..................... 455/452.2 |
| 2005/0153715 A1 * | 7/2005 | Hwang et al. ................ 455/458 |
| 2005/0249141 A1 * | 11/2005 | Lee et al. ..................... 370/312 |
| 2006/0040655 A1 * | 2/2006 | Kim ......................... 455/426.1 |
| 2006/0106865 A1 * | 5/2006 | Beming et al. ............ 707/104.1 |
| 2006/0252439 A1 * | 11/2006 | Cai ............................. 455/515 |
| 2006/0274780 A1 * | 12/2006 | Walsh et al. ................. 370/458 |

FOREIGN PATENT DOCUMENTS

WO    WO 2004/100447      11/2004

* cited by examiner

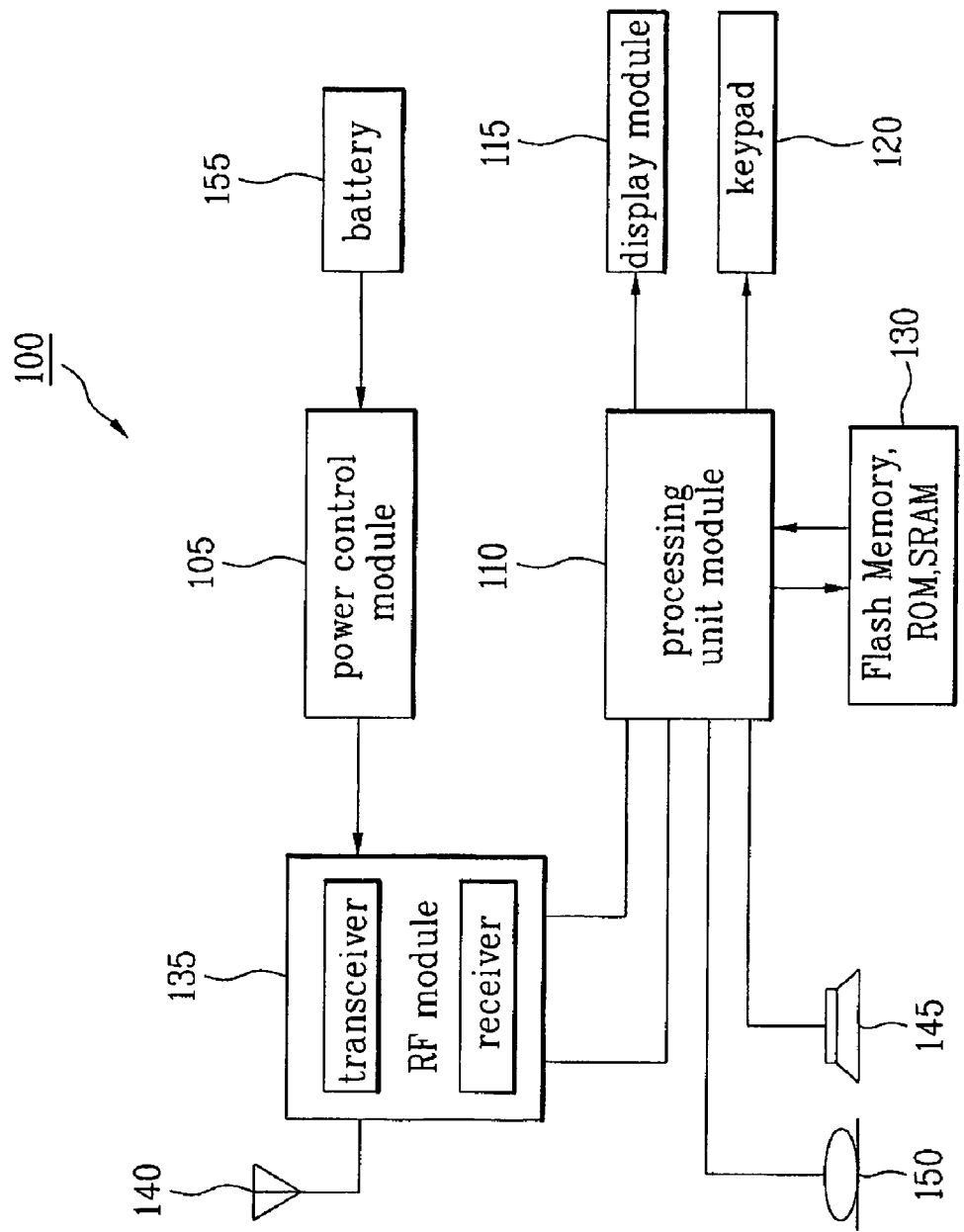

METHOD AND APPARATUS FOR PROVIDING POINT-TO-MULTIPOINT MULTIMEDIA SERVICE IN A MOBILE COMMUNICATIONS SYSTEM

CROSS-REFERENCE TO RELATED APPLICATIONS

Pursuant to 35 U.S.C. § 119(a), this application claims the benefit of earlier filing date and right of priority to Korean Application No. P2005-012363, filed on Feb. 15, 2005, the contents of which are hereby incorporated by reference herein in their entirety

BACKGROUND OF THE INVENTION

1. Field of the Invention

The present invention relates to a mobile communications system and, more particularly, to a method and apparatus for providing at least one mobile communication terminal, or user equipment (UE), with a point-to-multipoint multimedia service through two or more common physical channels in a mobile communications system.

2. Description of the Related Art

FIG. 1 is a block diagram of a network structure of a universal mobile telecommunications system (UMTS). Referring to FIG. 1, the universal mobile telecommunications system (hereinafter, referred to as 'UMTS') includes a user equipment 1 (hereinafter, referred to as 'UE'), a UMTS terrestrial radio access network 2 (hereinafter, referred to as 'UTRAN') and a core network 3 (hereinafter, referred to as 'CN'). The UTRAN 2 includes at least one radio network sub-system 4 (hereinafter, referred to as 'RNS') and each RNS includes a radio network controller 5 (hereinafter, referred to as 'RNC') and at least one base station 6 (hereinafter, referred to as 'Node B') managed by the RNC. The Node B 6 includes at least one cell.

FIG. 2 is an architectural diagram of a radio interface protocol between a UE 1 and UTRAN 2 based on the 3GPP (3rd Generation Partnership Project) radio access network specifications. Referring to FIG. 2, the radio interface protocol horizontally includes a physical layer, a data link layer and a network layer and the radio interface protocol vertically includes a user plane for data information transfer and a control plane for signaling transfer. The protocol layers in FIG. 2 can be divided into L1 (first layer), L2 (second layer), and L3 (third layer) based on lower three layers of the open system interconnection (OSI) standard model widely known in the communications systems.

The physical layer as the first layer provides an information transfer service to an upper layer using physical channels. The physical layer is connected to a medium access control (MAC) layer above the physical layer via transport channels through which data are transferred between the medium access control layer and the physical layer. Data is transmitted between different physical layers, and more particularly, between the physical layer of a transmitting side and the physical layer of a receiving side via physical channels.

The medium access control (MAC) layer of the second layer provides services to a radio link control (hereinafter abbreviated RLC) layer above the MAC layer via logical channels. The RLC layer of the second layer supports reliable data transfer and is operative in segmentation and concatenation of RLC service data units (SDUs) sent down from an upper layer.

A radio resource control (RRC) layer located on the lowest part of the third layer is defined in the control plane only and controls the logical channels, the transport channels, and the physical channels with configuration, reconfiguration, and release of radio bearers (RBs). An RB is a service offered by the second layer for the data transfer between the UE 1 and the UTRAN 2. Generally, configuring an RB refers to defining the characteristics of protocol layers and channels necessary for providing a specific service and is to establish respective specific parameters and operational methods for them.

A multimedia broadcast/multicast service (hereinafter, referred to as 'MBMS') offers a streaming or background service to a plurality of UEs 1 using a downlink dedicated MBMS bearer service. An MBMS is provided during one session, and data for the MBMS is transmitted to the plurality of UEs 1 via the MBMS bearer service during an ongoing session only. A UE 1 performs activation first for receiving the MBMS to which the UE has subscribed and receives the activated services only.

The UTRAN 2 provides the MBMS bearer service to at least one UE 1 using radio bearers. The radio bearers (RBs) used by the UTRAN 2 include a point-to-point radio bearer and a point-to-multipoint radio bearer.

The point-to-point radio bearer is a bi-directional radio bearer and is configured by a logical channel DTCH (dedicated traffic channel), a transport channel DCH (dedicated channel), and a physical channel DPCH (dedicated physical channel) or a physical channel SCCPCH (secondary common control physical channel). The point-to-multipoint radio bearer is a unidirectional downlink radio bearer and is configured by a logical channel MTCH (MBMS traffic channel), a transport channel FACH (forward access channel), and a physical channel SCPCH. The logical channel MTCH is configured for each MBMS offered to one cell and is used for transmitting user-plane data of a specific MBMS to a plurality of UEs.

As illustrated in FIG. 3, a logical channel MCCH (MBMS control channel) in a conventional system is a point-to-multipoint downlink channel used in transmitting control information associated with the MBMS. The logical channel MCCH is mapped to the transport channel FACH (forward access channel), while the transport channel FACH is mapped to the physical channel SCCPCH (secondary common control physical channel). A cell has only one MCCH.

The UTRAN 2 providing MBMS services transmits MCCH information through the MCCH channel to at least one UE 1. The MCCH information includes notification messages, specifically RRC messages related to the MBMS. For example, the MCCH information may include messages indicating MBMS service information, messages indicating point-to-multipoint radio bearer information or access information indicating that RRC connection for the MBMS is needed.

FIG. 4 is a diagram illustrating how MCCH information is transmitted in a conventional method. FIG. 5 illustrates a conventional method for providing an MBMS.

As illustrated in FIG. 4, the UTRAN 2 providing an MBMS service transmits the MCCH information to a plurality of UEs 1 via the MCCH channel. The MCCH information is periodically transmitted according to a modification period and a repetition period.

The MCCH information is categorized into critical information and non-critical information. The non-critical information can be freely modified each modification period or each repetition period. However, the critical information can be modified only each modification period.

Specifically, the critical information is repeated one time each repetition period. However, the modified critical information can be transmitted only at a start point of the modification period.

The UTRAN 2 periodically transmits a physical channel MICH (MBMS notification indicator channel) to indicate whether the MCCH information is updated during the modification period. Therefore, a UE 1 attempting to receive only a specific MBMS does not receive the MCCH or MTCH until a session of the service begins but receives the MICH (MBMS notification indicator channel) periodically. The update of the MCCH information refers to a generation, addition, modification or removal of a specific item of the MCCH information.

Once a session of a specific MBMS begins, the UTRAN 2 transmits an NI (notification indicator) through a MICH. The NI is an indication to a UE 1 attempting to receive the specific MBMS that it is to receive an MCCH channel. The UE 1, having received the NI via the MICH, receives an MCCH during a specific modification period indicated by the MICH.

The MCCH information is control information, specifically RRC messages, associated with an MBMS. The MCCH information includes MBMS modification service information, MBMS non-modification service information, MBMS point-to-multipoint RB information and access information.

A UE 1 attempting to receive a specific MBMS using a point-to-multipoint radio bearer receives MCCH information including radio bearer information via an MCCH and then configures the point-to-multipoint radio bearer using the received information. After configuring the point-to-multipoint radio bearer, the UE 1 keeps receiving a physical channel SCCPCH, to which an MTCH is mapped, in order to acquire data of the specific MBMS transmitted via the MTCH.

As illustrated in FIG. 6, a UTRAN 2 in a conventional system may transmit MBMS data discontinuously via the MTCH. In doing so, the UTRAN 2 periodically transmits a scheduling message to UEs 1 via an MSCH, specifically a SCCPCH carrying MTCH, to which an MTCH is mapped. The scheduling message indicates a transmission start timing point and transmission period of MBMS data transmitted during one scheduling period. The UTRAN 2 should previously inform the UE of a transmission period, specifically a scheduling period, of scheduling information.

The UE 1 obtains the scheduling period from the UTRAN 2 and then receives scheduling messages according to the scheduling period periodically. The UE 1 receives a SCCPCH carrying a MTCH discontinuously and periodically using the received scheduling messages. Specifically, according to the scheduling messages, the UE 1 receives the SCCPCH carrying the MTCH during times for which data is transmitted but does not receive the SCCPCH carrying the MTCH during times for which data is not transmitted. Using the above-described scheme, the UE 1 can receive data efficiently so that battery consumption may be diminished.

In the conventional method described above, a WCDMA system using a FDD (Time Division Duplex) mode transmits the SCCPCH using a channel code. This results in restricting the maximum transmission speed of an MBMS transmitted through the SCCPCH below 256 kbps, which is the maximum speed of the SCCPCH. Therefore, a disadvantage of the conventional method is that an MBMS service exceeding 256 kbps cannot be provided.

Therefore, there is a need for an apparatus and method that facilitates providing an MBMS service exceeding 256 kbps. The present invention addresses this and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

Accordingly, the present invention is directed to providing a method and apparatus for providing at least one user equipment (UE) with a point-to-multipoint multimedia service at a higher speed through two or more common physical channels in a mobile communications system. A radio network transmits a point-to-multipoint multimedia service through a plurality of physical channels using multi codes. A user equipment (UE) receives multiple channel code information through a control channel from the radio network, configures a plurality of physical channels using the received multiple channel code information and receives the point-to-multipoint multimedia service through the configured physical channels.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one aspect of the present invention, a method of providing a point-to-multipoint service to at least one mobile communications terminal in a mobile communications system is provided. The method includes a network configuring at least two multi-code physical channels and transmitting multi channel code information to the at least one mobile communication terminal, the multi channel code information related to the transmission of point-to-multipoint service data via the at least two multi-code physical channels, the at least one mobile communication terminal configuring at least two physical channels using the multi channel code information, the network transmitting the point-to-multipoint service data via the at least two multi-code physical channels and the at least one mobile communication terminal receiving the point-to-multipoint service data via the at least two multi-code physical channels.

It is contemplated that the method further includes the at least one mobile communication terminal combining point-to-multipoint service data received via the at least two multi-code physical channels. It is further contemplated that the method includes the network transmitting control information to the at least one mobile communication terminal via a specific one of the at least two multi-code physical channels and the at least one mobile communication terminal receiving the point-to-multipoint service data using the control information. Preferably, the control information includes a transport format combination indicator (TFCI).

It is contemplated that the method further includes the network transmitting a pilot signal to the at least one mobile communication terminal via the specific one of the at least two multi-code physical channels. It is further contemplated that the method further includes the network transmitting a point-to-point radio bearer (RB) including the multi channel code information.

It is contemplated that the method further includes the network transmitting the point-to-point radio bearer via a control channel. Preferably, the control channel is a secondary common control physical channel (SCCPCH) carrying an MBMS control channel (MCCH).

It is contemplated that each of the at least two multi-code physical channels is a secondary common control physical channel (SCCPCH) carrying an MBMS control channel (MCCH). It is contemplated that the multi channel code information is associated with one of a spreading code, an orthogonal code and an orthogonal variable spreading factor (OVSF) code. Preferably, the point-to-multipoint service is a multimedia broadcast or multicast service (MBMS).

In another aspect of the present invention, a method of providing a point-to-multipoint service to at least one mobile communications terminal in a mobile communications system is provided. The method includes receiving multi channel code information, the multi channel code information related to the transmission of point-to-multipoint service data via at least two multi-code physical channels, configuring at least two physical channels using the multi channel code information and receiving the point-to-multipoint service data via the at least two multi-code physical channels.

It is contemplated that the method further includes combining point-to-multipoint service data received via the at least two multi-code physical channels. It is further contemplated that the method further includes receiving control information via a specific one of the at least two multi-code physical channels and receiving the point-to-multipoint service data using the control information. Preferably, the control information includes a transport format combination indicator (TFCI).

It is contemplated that the method further includes receiving a pilot signal via the specific one of the at least two multi-code physical channels. Preferably, receiving the multi channel code information includes receiving point-to-point radio bearer (RB) information. More preferably, receiving the multi channel code information includes receiving point-to-point radio bearer (RB) information via a control channel.

It is contemplated that the control channel is a secondary common control physical channel (SCCPCH) carrying an MBMS control channel (MCCH). It is further contemplated that each of the at least two multi-code physical channels is a secondary common control physical channel (SCCPCH) carrying an MBMS control channel (MCCH).

It is contemplated that the multi channel code information is associated with one of a spreading code, an orthogonal code and an orthogonal variable spreading factor (OVSF) code. It is further contemplated that the point-to-multipoint service is a multimedia broadcast or multicast service (MBMS).

In another aspect of the present invention, a method for providing a point-to-multipoint service to at least one mobile communication terminal in a mobile communications system is provided. The method includes configuring at least two multi-code physical channels and transmitting multi channel code information, the multi channel code information related to the transmission of point-to-multipoint service data via the at least two multi-code physical channels and transmitting the point-to-multipoint service data via the at least two multi-code physical channels.

It is contemplated that the method further includes transmitting control information via a specific one of the at least two multi-code physical channels. Preferably, the control information includes a transport format combination indicator (TFCI).

It is contemplated that the method further includes transmitting a pilot signal via the specific one of the at least two multi-code physical channels. It is further contemplated that the method further includes transmitting point-to-point radio bearer (RB) information including the multi channel code information.

It is contemplated that the method further includes transmitting the point-to-point radio bearer information via a control channel. Preferably, the control channel is a secondary common control physical channel (SCCPCH) carrying an MBMS control channel (MCCH).

It is contemplated that each of the at least two multi-code physical channels is a secondary common control physical channel (SCCPCH) carrying an MBMS control channel (MCCH). It is further contemplated that the multi channel code information is associated with one of a spreading code, an orthogonal code and an orthogonal variable spreading factor (OVSF) code. Preferably, the point-to-multipoint service is a multimedia broadcast or multicast service (MBMS).

In another aspect of the present invention, a mobile communication terminal for receiving a point-to-multipoint service from a network is provided. The mobile communication terminal includes an antenna adapted to receive RF signals containing messages including multi channel code information and point-to-multipoint service data, the multi channel code information related to the transmission of the point-to-multipoint service data via at least two multi-code physical channels, an RF module adapted to process the RF signals received by the antenna, a keypad for inputting information from a user, a storage unit adapted to store the multi channel code information, a display adapted to convey information to the user and a processing unit adapted to configure at least two physical channels using the multi channel code information and to process the point-to-multipoint service data received via the at least two multi-code physical channels.

It is contemplated that the processing unit is further adapted to combine point-to-multipoint service data received via the at least two multi-code physical channels. It is further contemplated that the processing unit is further adapted to process the point-to-multipoint service data using control information received via a specific one of the at least two multi-code physical channels. Preferably, the control information includes a transport format combination indicator (TFCI).

It is contemplated that the processing unit is further adapted to process a pilot signal received via the specific one of the at least two multi-code physical channels. It is further contemplated that the processing unit is further adapted to process the multi channel code information by processing point-to-point radio bearer (RB) information.

It is contemplated that the point-to-point radio bearer (RB) information is received via a control channel. It is further contemplated that the control channel is a secondary common control physical channel (SCCPCH) carrying an MBMS control channel (MCCH).

It is contemplated that each of the at least two multi-code physical channels is a secondary common control physical channel (SCCPCH) carrying an MBMS control channel (MCCH). It is further contemplated that the multi channel code information is associated with one of a spreading code, an orthogonal code and an orthogonal variable spreading factor (OVSF) code. Preferably, the point-to-multipoint service is a multimedia broadcast or multicast service (MBMS).

In another aspect of the present invention, a network for providing a point-to-multipoint service to at least one mobile communication terminal in a mobile communications system is provided. The network includes a transmitter adapted to transmit signals containing multi channel code information and point-to-multipoint service data to the at least one mobile communication terminal, a receiver adapted to receive signals from the at least one mobile communication terminal and a controller adapted to configure at least two multi-code physical channels for transmitting the point-to-multipoint service data and generate the multi channel code information including information related to the transmission of the point-to-multipoint service data via the at least two multi-code physical channels.

It is contemplated that the controller is further adapted to transmit control information via a specific one of the at least two multi-code physical channels. It is further contemplated that the controller is further adapted to generate the control information including a transport format combination indicator (TFCI).

It is contemplated that the controller is further adapted to transmit a pilot signal via the specific one of the at least two multi-code physical channels. It is further contemplated that the controller is further adapted to transmit point-to-point radio bearer (RB) information including the multi channel code information.

It is contemplated that the controller is further adapted to transmit the point-to-point radio bearer information via a control channel. It is further contemplated that the control channel is a secondary common control physical channel (SCCPCH) carrying an MBMS control channel (MCCH).

It is contemplated that each of the at least two multi-code physical channels is a secondary common control physical channel (SCCPCH) carrying an MBMS control channel (MCCH). It is further contemplated that the multi channel code information is associated with one of a spreading code, an orthogonal code and an orthogonal variable spreading factor (OVSF) code. Preferably, the point-to-multipoint service is a multimedia broadcast or multicast service (MBMS).

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed. These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 10 illustrates a block diagram of a mobile communication device according to one embodiment of the present invention.

DETAILED DESCRIPTION OF THE PREFERRED EMBODIMENTS

The present invention relates to a method and apparatus for providing at least one user equipment (UE) with a point-to-multipoint multimedia service at a higher speed through two or more common physical channels in a mobile communications system. Although the present invention is illustrated with respect to a mobile communication terminal, it is contemplated that the present invention may be utilized anytime it is desired to provide a point-to-multipoint multimedia service to any device in a mobile communications system.

Reference will now be made in detail to the preferred embodiments of the present invention, examples of which are illustrated in the accompanying drawings. Wherever possible, the same reference numbers will be used throughout the drawings to refer to the same or like parts.

Figure 1:
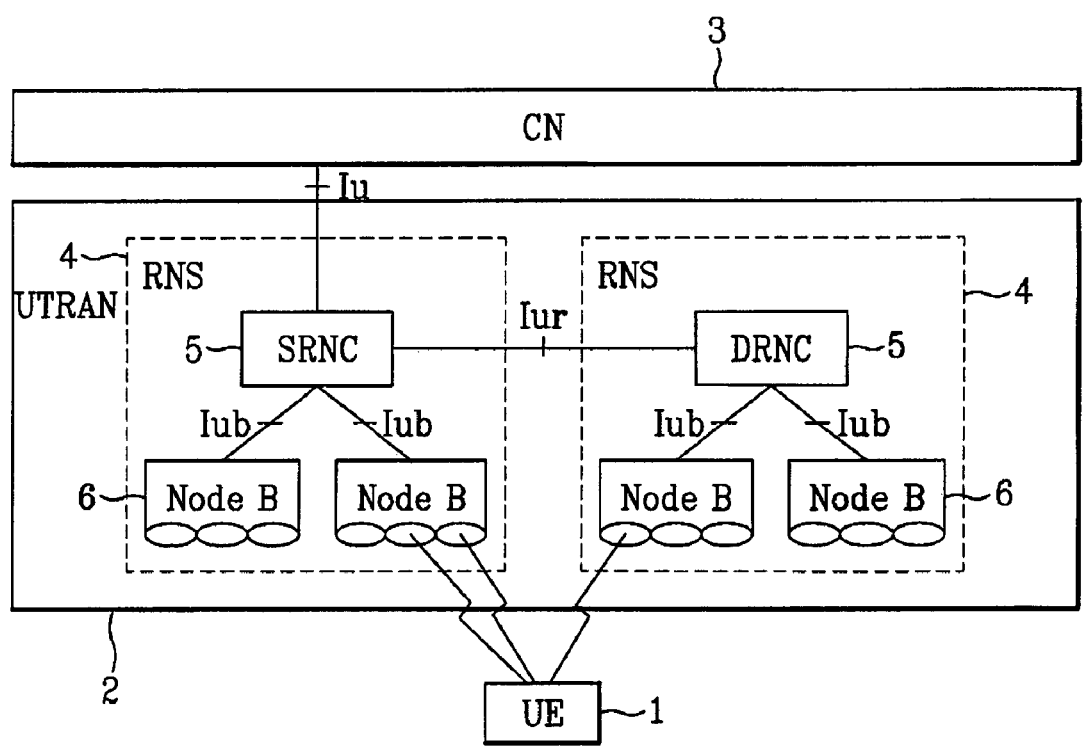
FIG. 1 is a block diagram of a network structure of a universal mobile telecommunications system (UMTS).
Figure 2:
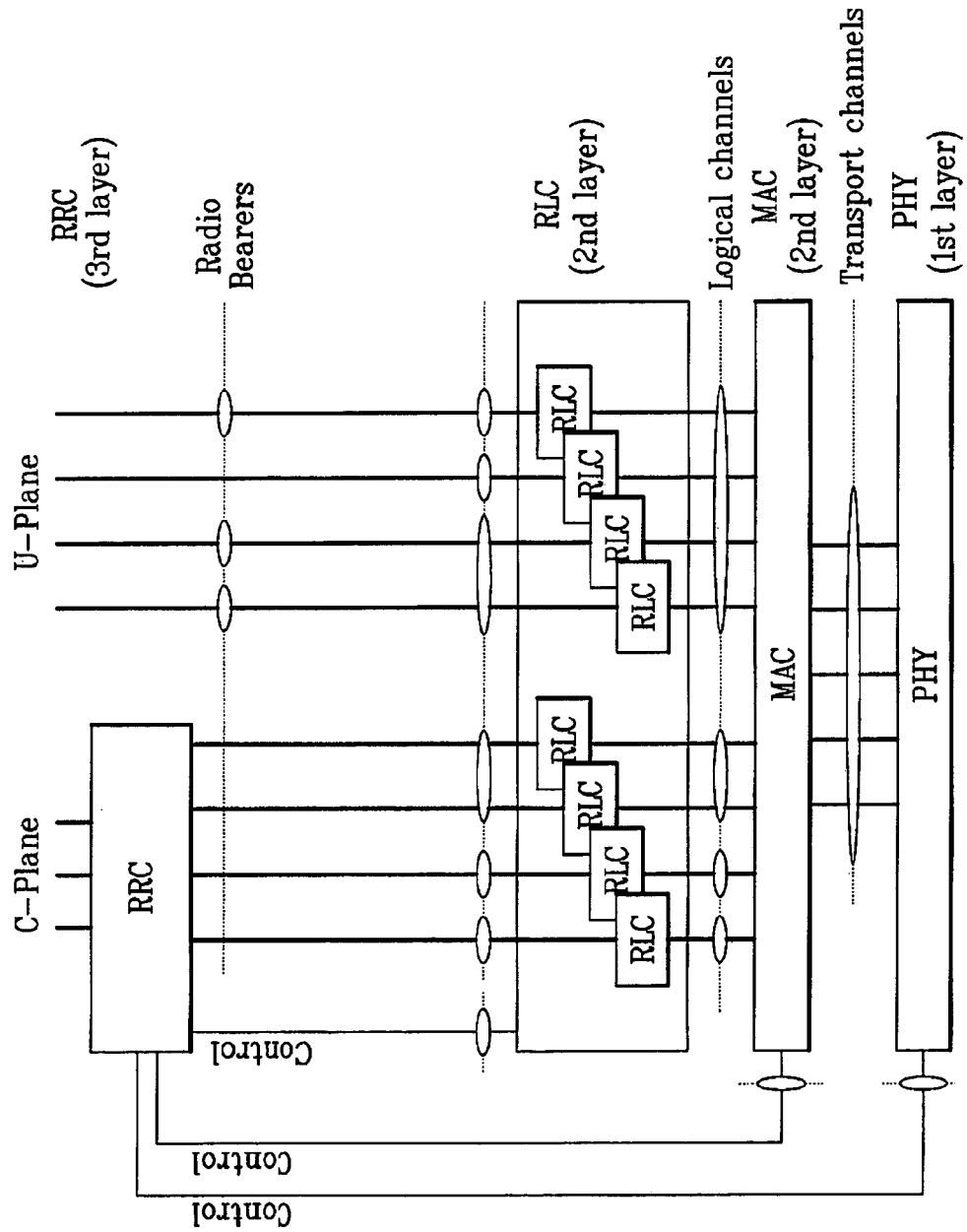
FIG. 2 is an architectural diagram of a radio interface protocol between a UE (user equipment) and UTRAN (UMTS terrestrial radio access network) based on the 3GPP (3rd Generation Partnership Project) radio access network specifications.
Figure 3:
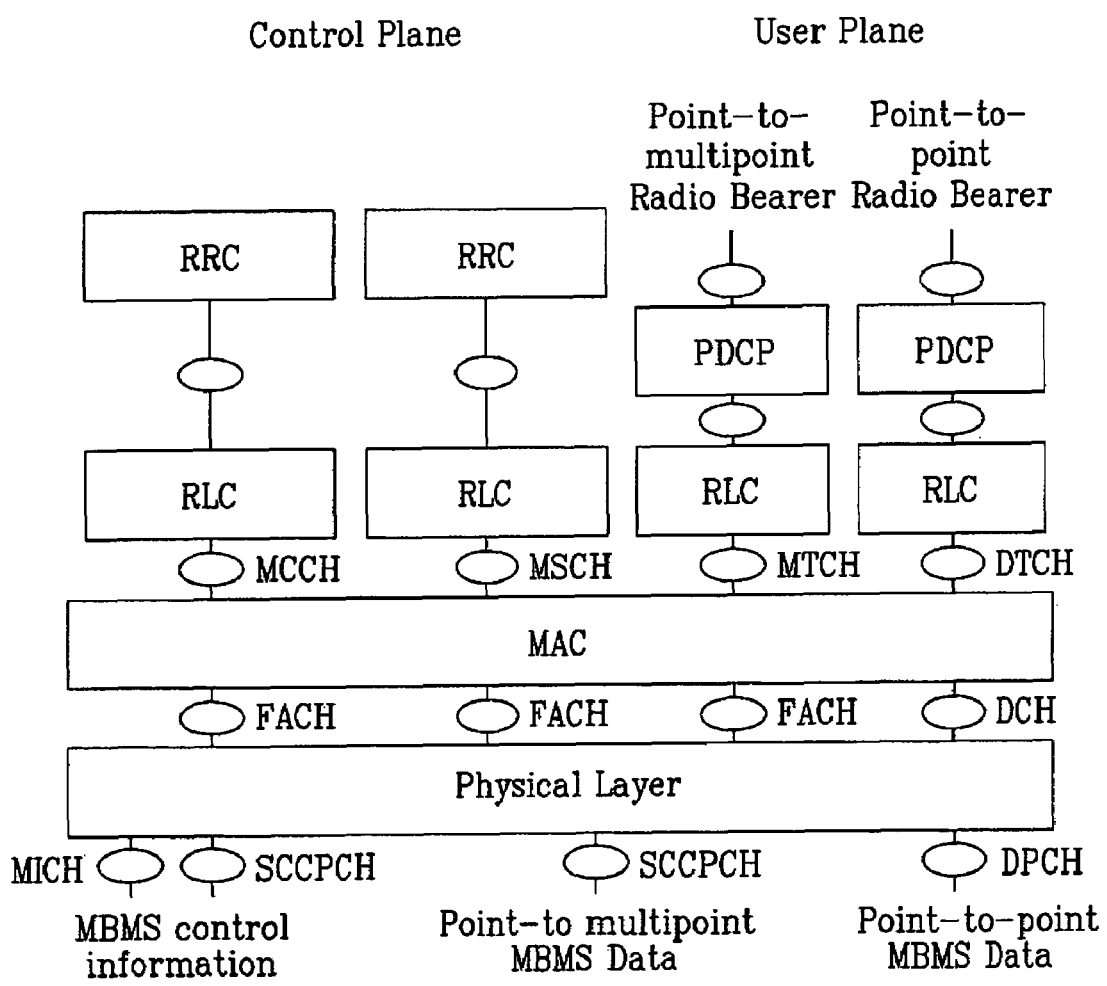
FIG. 3 is a diagram illustrating a channel configuration for an MBMS in a conventional UE.
Figure 4:
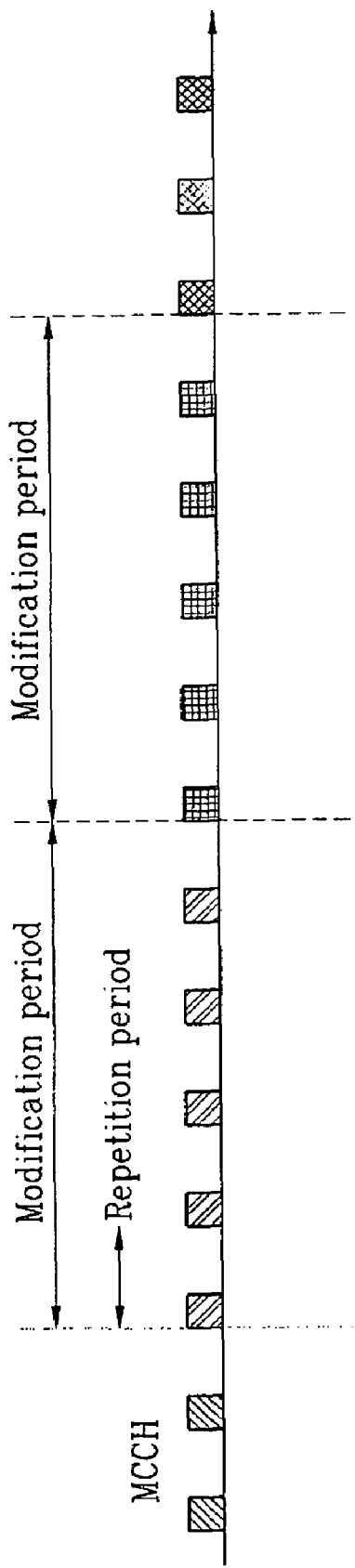
FIG. 4 is a diagram illustrating a transmission scheme of MCCH information in a conventional system.
Figure 5:
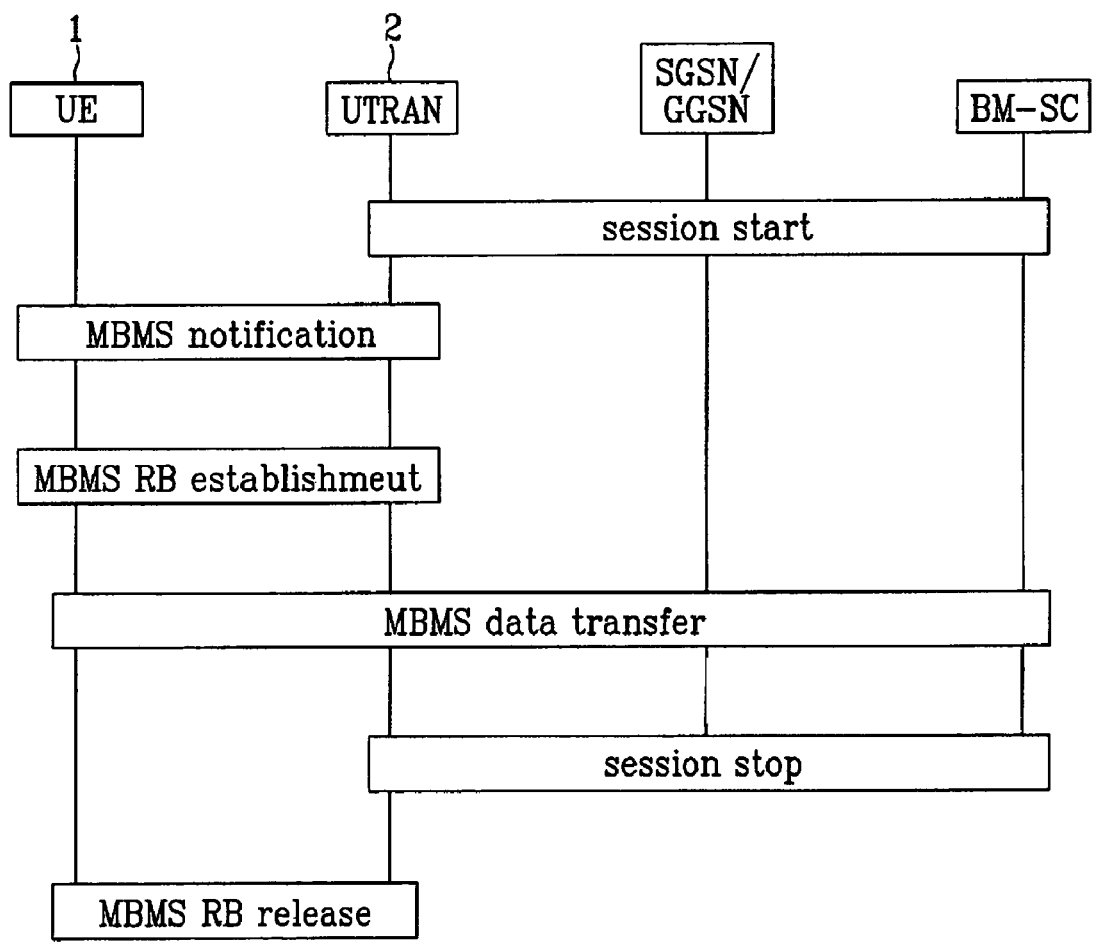
FIG. 5 is a flowchart illustrating a conventional method of providing an MBMS.
Figure 6:
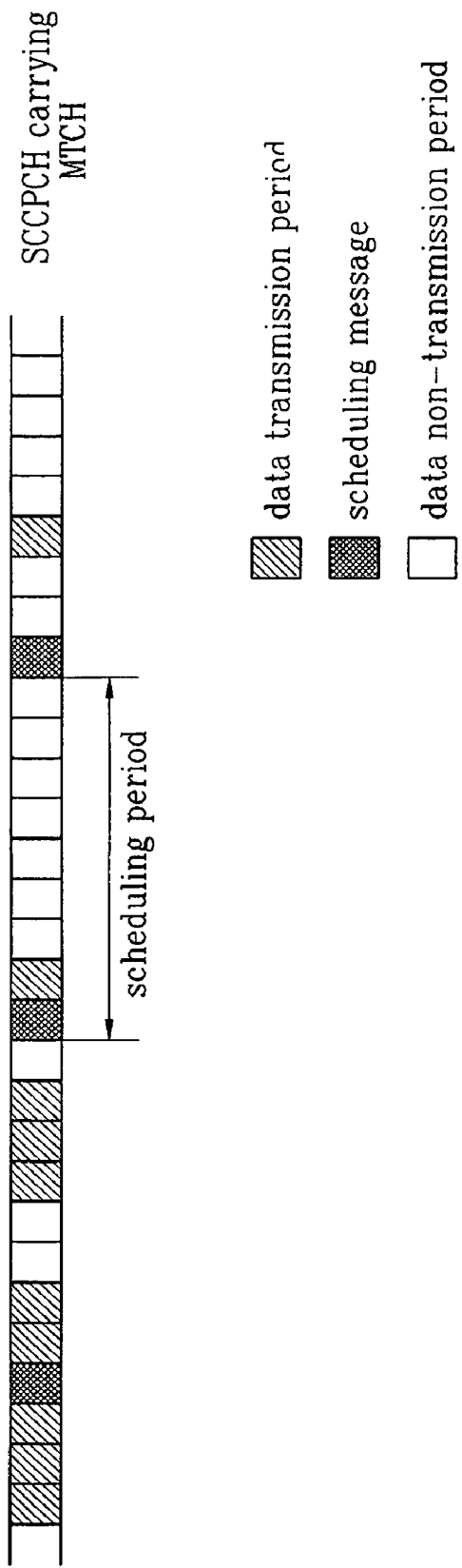
FIG. 6 is a diagram illustrating a discontinuous data transmission scheme for an MBMS through a MTCH in a conventional system.
Figure 7:
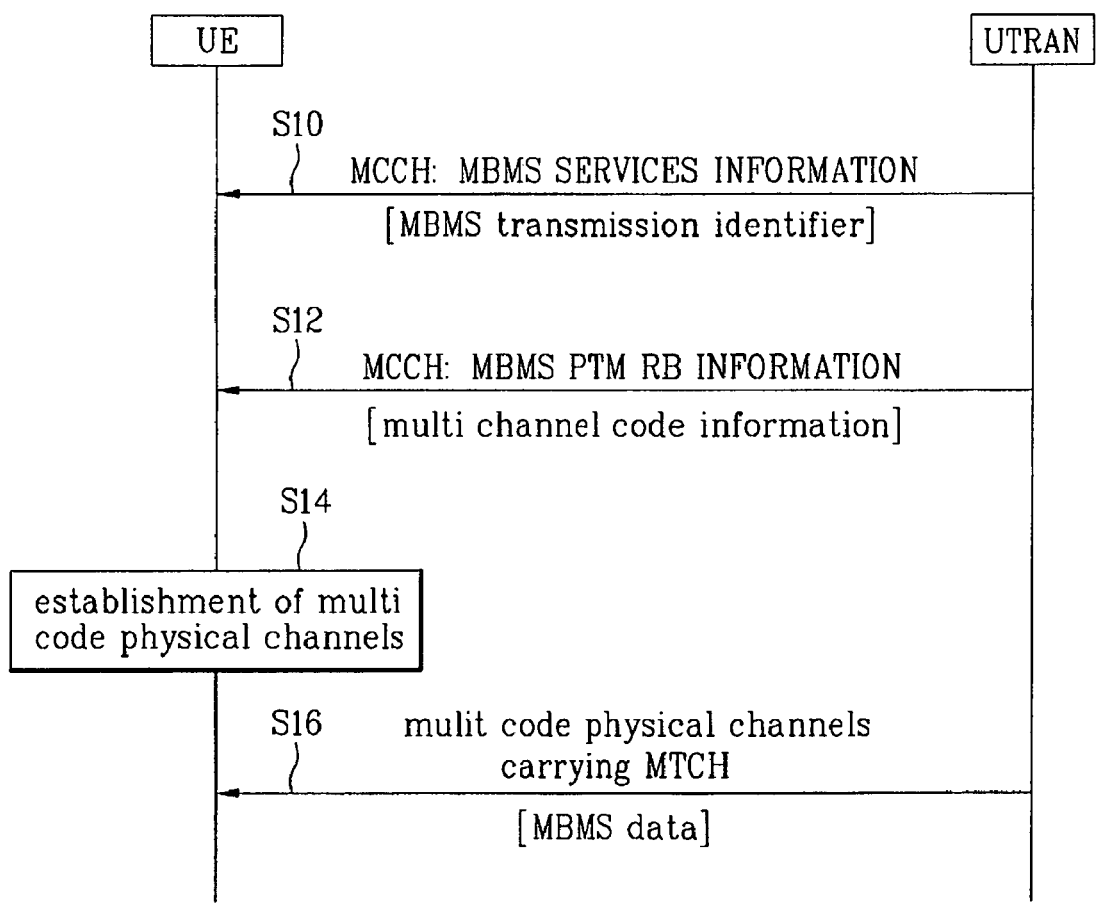
FIG. 7 illustrates procedures according to one embodiment of the present invention.

FIG. 7 illustrates a method according to a preferred embodiment of the present invention. The embodiment of FIG. 7 is an example in which the technical features of the present invention are applied to a multimedia broadcast or multicast service (MBMS) in a UMTS system having the structure depicted in FIG. 1, for example, when a UE 1 transmits and receives data in a FDD mode of WCDMA.

As illustrated in FIG. 7, a UTRAN 2 transmits an MBMS transmission identifier of an MBMS via an MBMS service information message through an MCCH to a UE 1 (S10). The UE 1, intending to receive the MBMS after receiving the MBMS service information message, receives MBMS point-to-multipoint radio bearer (RB) information from the UTRAN (S12).

The UTRAN 2 informs the UE via the MBMS point-to-multipoint RB information of multi channel code information for configuring multi-code physical channels through which the MBMS is transmitted. The multi channel code information includes code information allocated to at least two physical channels (SCCPCH) through which the MBMS is transmitted.

The UE 1 checks whether it has the capacity to receive the MBMS using the multi channels. If the UE is able to receive the MBMS, an RRC layer of the UE 1 configures two or more physical channels using the received multi channel code information (S14).

The UE 1 receives physical channels carrying MTCH data using the multi-code (S16). When the UE 1 receives radio bearer information of neighbor cells, it may receive data by combining physical channels transmitted from two or more cells.

Figure 8:
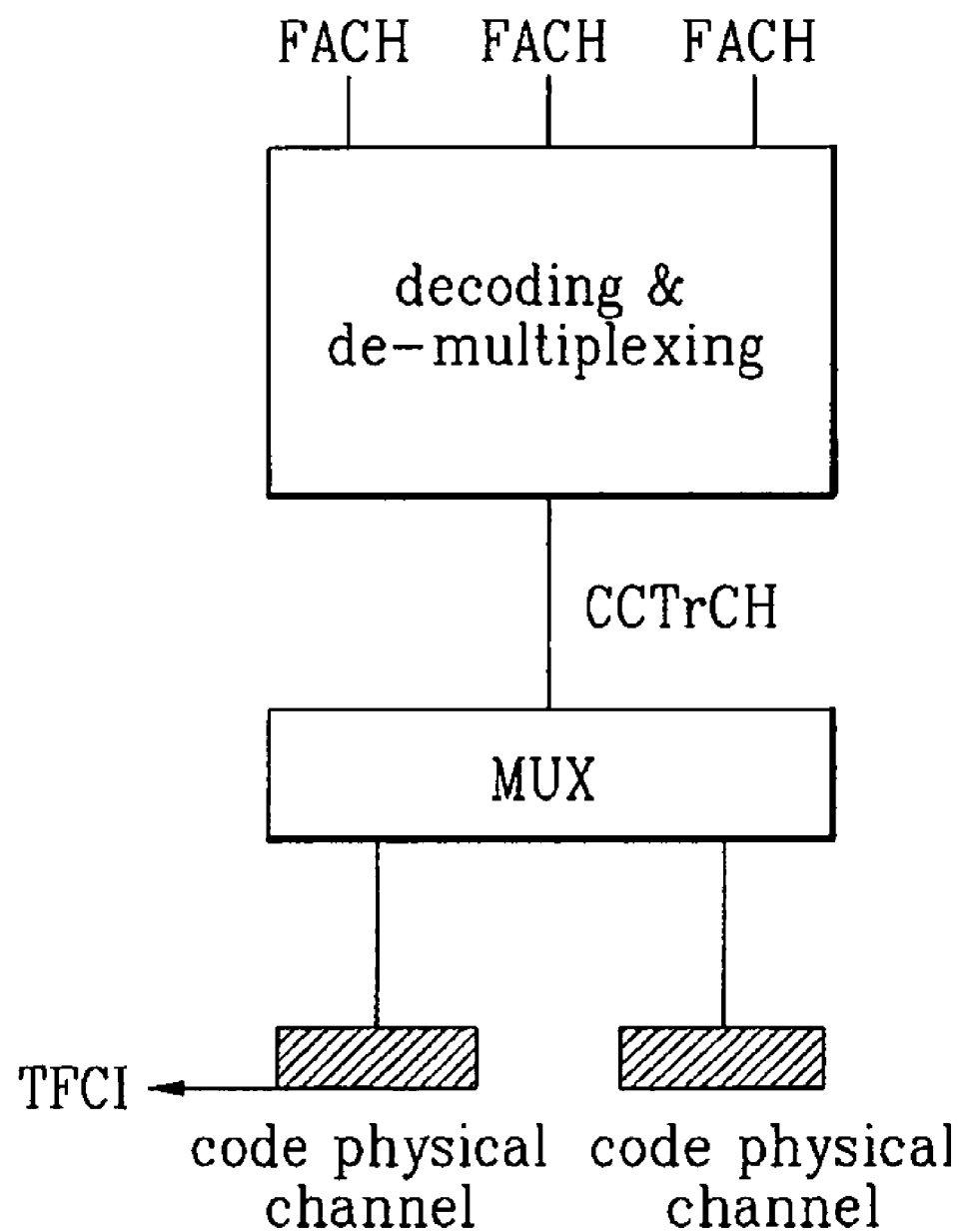
FIG. 8 is a diagram illustrating the structure of a physical channel related to multi code SCCPCH channels in a UE according to one embodiment of the present invention.

FIG. 8 is a diagram illustrating the structure of a physical channel related to multi code SCCPCH channels in a UE 1 according to a preferred embodiment of the present invention. When an MTCH is mapped to a FACH to be transmitted, the physical layer of the UTRAN 2 divides and transmits the MBMS data of at least one FACH mapped to a coded composite transport channel (CCTrCH) through two or more code physical channels configured using the multi channel code information. The UE 1 obtains transmit format combination indicator (TFCI) information through a physical channel from the multiplexed two or more physical channels and receives the two or more physical channels using the TFCI information.

The UE 1, which has received the two or more physical channels for the CCTrCH, combines, decodes, and multiplexes the received data and then transmits the result to the corresponding FACHs. MTCH data can be transmitted and received through two or more physical channels.

Figure 9A:
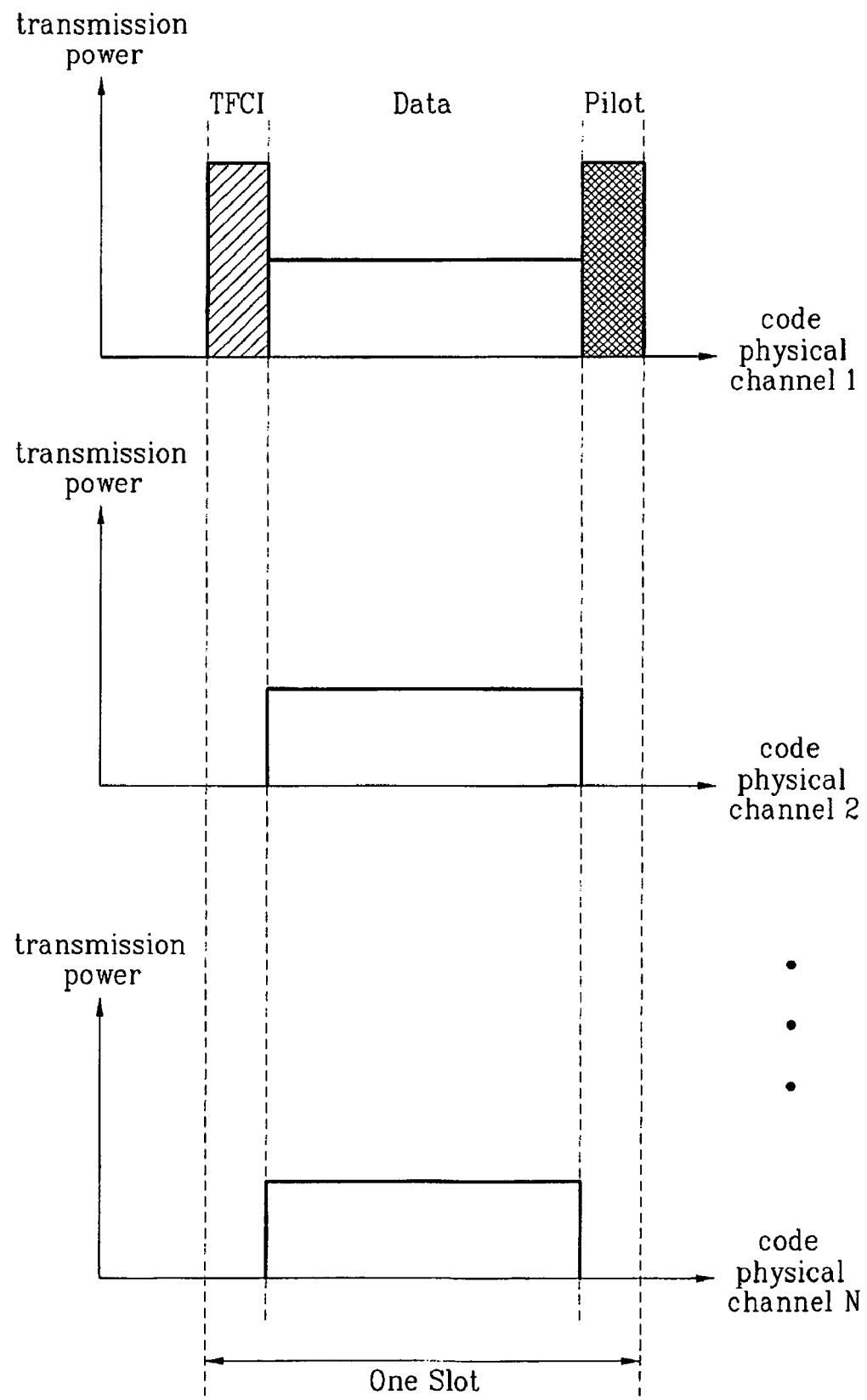
FIGS. 9A and 9B are diagrams illustrating a multi-code transmission scheme according to one embodiment of the present invention.
Figure 9B:
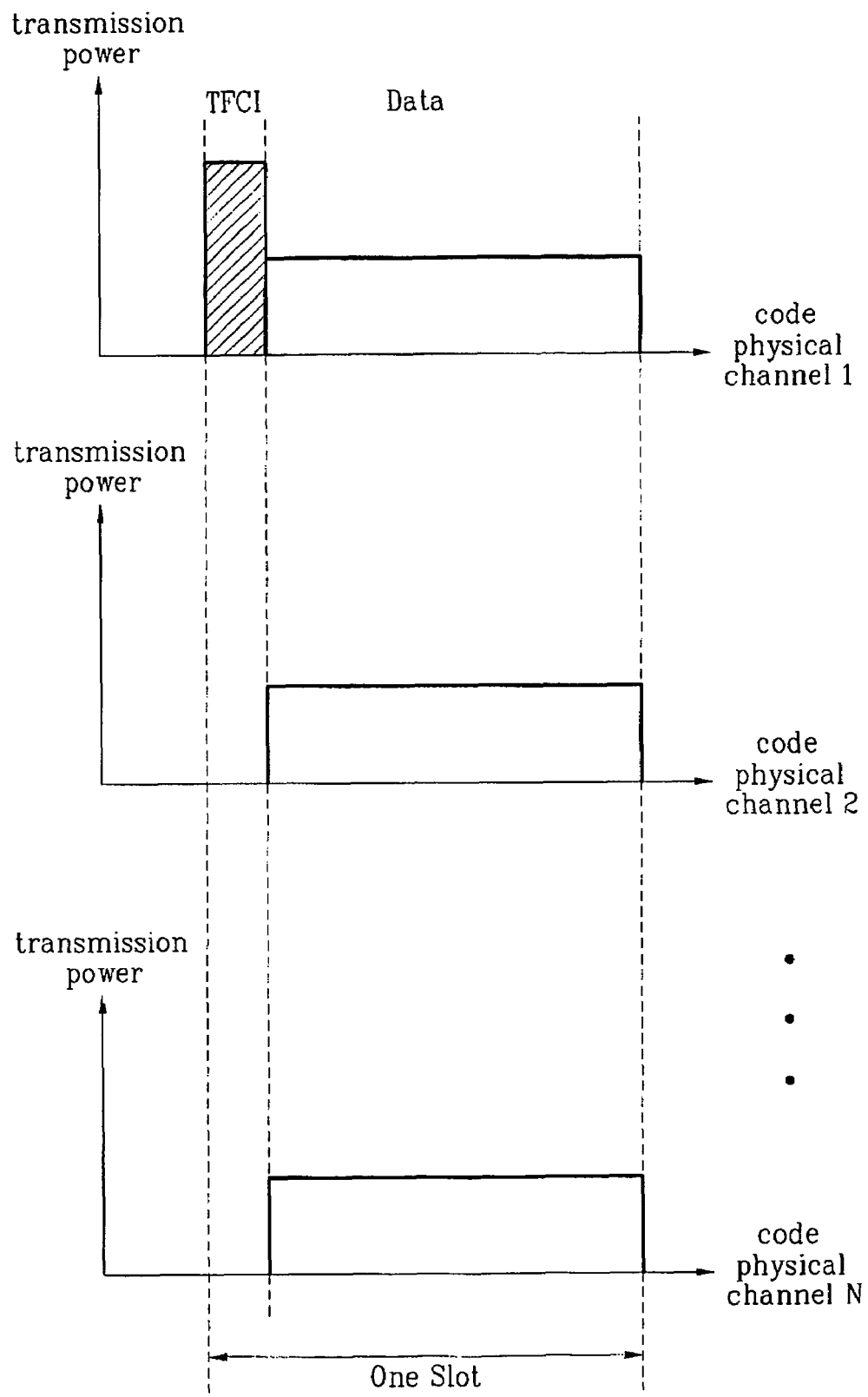

FIGS. 9A and 9B are diagrams illustrating a multi-code transmission scheme according to a preferred embodiment of the present invention. FIG. 9A illustrates an example where the TFCI and pilot signals are transmitted with the MBMS data in one slot. FIG. 9B illustrates an example where the TFCI and the MBMS data are transmitted. FIGS. 9A and 9B are diagrams illustrating a structure for one slot. The same structure can be applicable to every slot of the SCCPCH.

When control information for physical channels, such as the TFCI or the pilot signals, is transmitted together with the MBMS data, the control information is transmitted through one physical channel alone. The MBMS data is transmitted through the multiple physical channels.

The above-described embodiments are illustrated for a 3GPP mobile communications system. However, it will be apparent to those having ordinary skill in the art that the present invention is also applicable to a wireless communications system for a personal digital assistant (PDA) or a personal computer (PC) within which a mobile communication interface is installed.

Furthermore, the scope of the present invention should not be interpreted within the scope of a UTMS system. The present invention may be applied to other mobile communications systems using other air interfaces and physical channels, for example, TDMA, CDMA, or FDMA.

The present invention can be implemented in software, firmware, hardware or a combination thereof. Specifically, the present invention can be implemented using hardware logic such as codes, circuit chips or ASIC, or by using a computer program language in a computer-readable storage medium, such as a hard disk, floppy disk, tape, optical storage medium, ROM or RAM.

The code stored in the computer-readable storage medium can be accessed and processed by a processor through a transmission medium or a file server on a network. The apparatus storing the code includes a wire transmission medium, such as a network transmission line, a wireless transmission medium, signal transmission, wireless signals, and infrared ray signals.

FIG. 10 illustrates a block diagram of a mobile communication device 100 for performing the functions of the preferred embodiments of the present invention. The mobile communication device 100 includes a processing unit module 110, such as a microprocessor or a digital processor, an RF module 135, a power control module 105, an antenna 140, a battery 155, a display module 115, a keypad 120, a storage module 130, such as a ROM, a SRAM, or flash memory, a speaker 145 and a microphone 150.

A user inputs command information, such as phone numbers, using the keypad 120 or uses voice activation using the microphone 145. The processing unit module 110 receives and processes the command information to perform the function requested by the user. In order to perform the function, the processing unit module 110 retrieves and uses data stored in the storage module 130 and displays the command information and the retrieved data on the display module 115 for the user's convenience.

The processing unit module 110 instructs the RF module 135 to transmit radio signals including voice data. The RF module 135 includes a transceiver and a receiver for transmitting and receiving the radio signals and the radio signals are transmitted and received through the antenna 140. When receiving the radio signals, the RF module 135 converts the radio signals into base band frequency signals such that the processing unit module 110 may process the base band frequency signals. The processed signals can be delivered to the user through the speaker 145 or in a form of readable information.

The RF module 135 receives data from a network or transmits information measured or generated by the mobile communication device 100 to the network. The storage module 130 stores information measured or generated by the mobile communication device 100. The processing unit module 110 processes the received data or data to be transmitted as well as performing the methods of the present invention disclosed herein.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of receiving a point-to-multipoint service at a mobile communications terminal in a mobile communications system, the method comprising:

receiving radio bearer (RB) information comprising multi channel code information on a control channel, the multi channel code information including at least two channelization codes for configuring at least two multi-code physical channels;

receiving a transport format combination indicator (TFCI), the TFCI indicating a transport format combination associated with the at least two multi-code physical channels; and receiving data for the point-to-multipoint service on the at least two multi-code physical channels based on the received TFCI, wherein the TFCI is received on a first multi-code physical channel only among the at least two multi-code physical channels and the first multi-code physical channel is a multi-code physical channel having a lowest index among the at least two multi-code physical channels, and wherein each of the at least two channelization codes is one of a spreading code, an orthogonal code and an orthogonal variable spreading factor (OVSF) code.

2. The method of claim 1, further comprising combining the point-to-multipoint service data received via the at least two multi-code physical channels.

3. The method of claim 1, further comprising receiving a pilot signal on the first multi-code physical channel.

4. The method of claim 1, wherein the control channel is a secondary common control physical channel (SCCPCH) carrying an MBMS control channel (MCCH).

5. The method of claim 1, wherein each of the at least two multi-code physical channels is a secondary common control physical channel (SCCPCH) carrying an MBMS traffic channel (MTCH).

6. The method of claim 1, wherein the point-to-multipoint service is a multimedia broadcast or multicast service (MBMS).

7. A method for providing a point-to-multipoint service to at least one mobile communication terminal in a mobile communications system, the method comprising:

transmitting radio bearer (RB) information comprising multi channel code information on a control channel to the at least one mobile communication terminal, the radio bearer (RB) information including at least two channelization codes for configuring at least two multi-code physical channels;

transmitting a transport format combination indicator (TFCI) to the at least one mobile communication terminal, the TFCI indicating a transport format combination associated with the at least two multi-code physical channels; and transmitting data for the point-to-multipoint service on the at least two multi-code physical channels based on the TFCI, wherein the TFCI is transmitted to the at least one mobile communication terminal on a first multi-code physical channel only among the at least two multi-code physical channels and the first multi-code physical channel is a multi-code physical channel having a lowest index among the at least two multi-code physical channels, and wherein each of the at least two channelization codes is one of a spreading code, an orthogonal code and an orthogonal variable spreading factor (OVSF) code.

8. The method of claim 7, further comprising transmitting a pilot signal on the first multi-code physical channel.

9. The method of claim 7, wherein the control channel is a secondary common control physical channel (SCCPCH) carrying an MBMS control channel (MCCH).

10. The method of claim 7, wherein each of the at least two multi-code physical channels is a secondary common control physical channel (SCCPCH) carrying an MBMS traffic channel (MTCH).

11. The method of claim 7, wherein the point-to-multipoint service is a multimedia broadcast or multicast service (MBMS).

12. A mobile communication terminal for receiving a point-to-multipoint service from a network, the mobile communication terminal comprising:

an antenna adapted to receive RF signals containing messages comprising multi channel code information, a transport format combination indicator (TFCI) and point-to-multipoint service data, the multi channel code information including at least two channelization codes for configuring at least two multi-code physical channels and the TFCI indicating a transport format combination associated with the at least two multi-code physical channels;

an RF module adapted to process the RF signals received by the antenna;

a keypad for inputting information from a user;

a storage unit adapted to store the multi channel code information;

a display adapted to convey information to the user; and a processing unit adapted to configure at least two physical channels using the multi channel code information and to process the point-to-multipoint service data received via the at least two multi-code physical channels based on the TFCI, wherein the TFCI is received on a first multi-code physical channel only among the at least two multi-code physical channels and the first multi-code physical channel is a multi-code physical channel having a lowest index among the at least two multi-code physical channels, and wherein each of the at least two channelization codes is one of a spreading code, an orthogonal code and an orthogonal variable spreading factor (OVSF) code.

13. The apparatus of claim 12, wherein the processing unit is further adapted to process the multi channel code information by processing point-to-point radio bearer (RB) information.

14. The apparatus of claim 13, wherein the point-to-point radio bearer (RB) information is received via a control channel.

15. The apparatus of claim 14, wherein the control channel is a secondary common control physical channel (SCCPCH) carrying an MBMS control channel (MCCH).

16. The apparatus of claim 12, wherein each of the at least two multi-code physical channels is a secondary common control physical channel (SCCPCH) carrying an MBMS traffic channel (MTCH).

17. The apparatus of claim 12, wherein the point-to-multipoint service is a multimedia broadcast or multicast service (MBMS).

* * * * *